Patented Apr. 11, 1939

2,153,849

UNITED STATES PATENT OFFICE 2,153,849

HIGH STRENGTH CIDER VINEGAR AND METHOD OF MAKING SAME

Victor E. Speas, Kansas City, Mo., assignor to Speas Company, a corporation of Missouri No Drawing. Application November 8, 1937, Serial No. 173,455

8 Claims. (Cl. 99—147)

This invention relates to improvements in vinegar manufacture, and more particularly, to an improved high strength cider vinegar and to its production. By proceeding in accordance with this invention, I am able to produce as a new article of commerce, a special high strength cider vinegar having essentially all the distinguishing characteristics of a normal cider vinegar, and at the same time containing a relatively higher acetic acid content obtained by chemico-biological means.

Cider or apple vinegar, by reason of its production from apples, is distinguished by many desirable characteristics. In addition to acetic acid, a normal cider vinegar contains malic acid, aromatic ethers, and many extractive congeners, including mineral salts, small amounts of sugar, glycerine, and proteins, and carries with it notable quantities of vitamins, which are naturally found in the apple; and as cider vinegar is not subjected to any heating processes in the ordinary course of its manufacture, the vitamins and aromatic congeners are not destroyed or impaired. These extractive congeners impart to cider vinegar an advantageous and characteristic flavor and aroma, and also greatly enhance its nutritive value.

Heretofore cider vinegars, as ordinarily produced, have contained a maximum concentration of acid, calculated as acetic, of from about 4 to about 6%, referred to in the trade as 40 to 60 grains, as 1% is usually considered as being the equivalent of 10 grains of acetic strength. An average acid strength would be 5½% (calculated as acetic acid), or 55 grains, and of this approximately 3½ or 4 grains represents malic acid originally present in the apples and in the cider stock before acetification. The acid strength of normal cider vinegar, however, is principally dependent on the sugar content of the apples from which the cider stock and the vinegar is made, this content usually approximating 10 to 12%. After undergoing an average alcoholic fermentation this will produce from 5 to 5½% of alcohol. This percentage of alcohol, when converted into acetic acid in the production of vinegar by the ordinary processes of acetification will produce, as stated above, approximately 55 grain vinegar. This low acid strength has hitherto restricted and confined the use of cider vinegar almost entirely to table and household uses. In many of the different manufacturing processes as distinguished from household uses, such as the commercial production of pickles, relishes, mayonnaise, salad dressing, mustard, etc., a higher acid content in the order of from 90 to 100 grains acetic strength is required. At present, these products are manufactured with high strength distilled vinegar of the order of 100 grains or higher, and this distilled vinegar is entirely lacking in the natural mineral salts, malic acid, flavor, or aroma-imparting constituents found in cider vinegars, and it is also essentially free from vitamins, which have been destroyed by the high temperatures used in the distillation of the alcohol from which the distilled vinegar is made. The use of cider vinegars for such purposes could be highly desirable. I have found that by operating in accordance with this invention I can produce a high strength cider vinegar of the order of from 90 to 100 grain strength, or higher, and at the same time retain the desirable qualities and properties of a normal cider vinegar in substantially the same proportions in which they were originally present. This high strength cider vinegar, produced in accordance with my invention, possesses the characteristic flavor and aroma of cider vinegar, and contains malic acid, mineral salts, aromatic ethers, vitamins, and other desirable constituents, and in addition, due to its increased acetic strength, is admirably suited for use in the different manufacturing processes in which a high acid strength is essential.

In carrying out my invention I may employ a cider stock capable of generating a normal strength cider vinegar of approximately 54 to 55 grains by volume after acetification. To this cider stock I add the desired proportion, suitably from 1 to 10% of 190 proof pure grain alcohol, or an equivalent proportion of alcohol of different strength. The alcohol-treated stock is subjected to acetic fermentation in the usual manner in any of the known types of vinegar generators, and upon completion of acetification the vinegar will possess an acid strength in the order of 65 to 125 grains, or higher. As 190 proof (95%) alcohol, if completely converted, would theoretically generate an acetic strength of approximately 950 grains, it is possible, by determining the grain strength that any particular cider stock being treated is capable of developing, i. e., its alcohol and acid content, to estimate the quantity of 190 proof or other alimentary alcohol necessary to add to this stock to develop a finished vinegar of any desired grain strength. It is thus apparent that, in practicing the present invention, relatively small amounts of high-proof alcohol are used, and that the content of malic acid, mineral salts, aromatic ethers, vitamins, and other desirable constituents, is not substantially altered, the small variation being well within the range normally occurring in different natural cider vinegars.

For example, an average sample of normal cider stock was divided into two portions, the first serving as a control, and to the second portion was added 5% by volume of 190 proof alcohol; upon acetification they yielded the following analytical results:

1
Control

| | |
|---|---|
| Total acidity | 55.0 grains |
| Malic acid | 3.5 grains |
| Specific gravity | 1.015 |
| Total solids | 2.49% |
| Ash | 0.34% |
| Alkalinity of ash | 35.5 |

2
5% of 190 proof alcohol added

| | |
|---|---|
| Total acidity | 100.0 grains |
| Malic acid | 3.35 grains |
| Specific gravity | 1.014 |
| Total solids | 2.37% |
| Ash | 0.32% |
| Alkalinity of ash | 35.5 |

It is thus apparent that the proportions of constituents other than acetic acid are well within the range of those normal for cider vinegar of the ordinary strength.

The high strength cider vinegar of the present invention is further distinguished from distilled vinegars of similar acid strength by its flavor, the appreciable amounts of malic acid present, the laevo-rotary character of its sugars, the predominance of potash in the ash, and because of the typical fragrant aroma of cider vinegar, indicating the presence of its aromatic congeners.

This invention, therefore, permits the production of a high-strength cider vinegar of any predetermined acetic acid strength higher than normal, thereby opening up new avenues of distribution, broadening the commercial use of cider vinegar, and thereby furnishing a tremendously increased outlet for sub-standard apples.

In carrying out my invention I find it desirable, but not essential, in order to maintain the acetic ferment in a vigorous and active state, and to secure continuity of manufacture, to gradually and progressively add the desired quantities of alcohol to the cider stock during acetification in such manner that the stock being fed to the vinegar generators for acetification does not contain more than from 2 to 4% of alcohol at any given time. When this percentage is reduced during acetification, additional alcohol is added until the desired strength is attained. It should be understood that the total quantity of alcohol which can advantageously be added to a cider stock for the purpose of making this higher than normal acetic strength cider vinegar is limited to the acid concentration at which the vinegar ferment, Mycoderma aceti, can actively and economically convert the alcohol into acetic acid, and it is considered unprofitable or undesirable to attempt to produce higher than 120 grain vinegar, as above this point the action of the vinegar ferment usually slows down to a point that is economically unprofitable. To produce such a product would, in general, require the use of about 5 to 10% of 190 proof alcohol, depending upon the proportion of alcohol in the original cider stock.

In the following illustrative example I describe a process embodying my invention, wherein a cider stock capable of generating approximately a 55 grain vinegar under ordinary conditions is treated in accordance with my invention to produce high strength cider vinegar of approximately 100 grains acetic strength.

To a conventional vinegar generator (acetifier) packed with wood shavings, coke, grids, or other suitable packing material, I feed 95 parts of the cider to be processed, and containing approximately 5% to 5.5% of the natural alcohol produced from the alcoholic fermentation of the sugar originally contained in the cider as expressed from the apples. After the conversion of part of this natural alcohol into acetic acid by the acetic ferment, I then gradually add 5 parts, preferably of 190 proof alcohol at such rate that the alcoholic content at any given time will not be high enough to adversely affect the activity of the vinegar ferment. This acetification may be accomplished, for example, by passing the stock through a series of generators, adding a portion of the alcohol after passing through each generator; or it may be accomplished by recycling the stock through the same generator, adding a portion of the alcohol after each passage; and is continued until conversion is substantially completed or until the alcohol content of the finished vinegar is in the order of 0.3 to 0.4%, which is considered good commercial practice. The vinegar so produced will now contain substantially all of the desirable and distinguishing characteristics of the original cider stock, and in addition, will contain in the order of 100 grains acetic strength, and will be particularly adapted to the manufacture of the different products already enumerated.

It is of course obvious that my invention is not to be construed as limited to the specific details set forth in this illustrative example, as it is apparent that variations may be made without departing from the spirit of this invention.

I claim:

1. A cider vinegar having a grain strength substantially higher than 60 and up to about 120 and having substantially the flavor and aroma of a normal cider vinegar, and containing malic acid and cider vinegar congeners in substantially the same percentages as in normal cider vinegar of grain strength of 40 to 60.

2. A cider vinegar having a grain strength of about 90 to 100 grains and having substantially the flavor and aroma of cider vinegar, and containing malic acid, and other cider vinegar congeners in substantially the same percentages as in normal cider vinegar of 60 grains and less.

3. A cider vinegar having a grain strength of about 100 grains and having substantially the flavor and aroma of cider vinegar, and containing malic acid and other cider vinegar congeners in substantially the same percentages as in normal cider vinegar of 60 grains and less.

4. The method of preparing a cider vinegar having a grain strength higher than normal and having substantially the flavor and aroma of a cider vinegar and having present therein malic acid and cider vinegar congeners in substantially the same percentages as in cider vinegar of normal grain strength comprising introducing a cider stock feed and grain alcohol in an amount not in excess of about 10% to a vinegar generator while maintaining in the feed from about 2% to about 4% of alcohol in respect of the feed and subjecting the feed and the alcohol to an acetous fermentation in said generator.

5. The method of preparing cider vinegar having a strength in the order of 100 grains and having substantially the flavor and aroma of a cider vinegar and having present therein malic acid and cider vinegar congeners in substantially the same percentages as in cider vinegar having a strength in the order of 60 grains comprising subjecting 95 parts of cider stock and 5 parts of 190 proof alcohol to acetous fermentation.

6. The method set forth in claim 5 wherein the introduction of the alcohol is so controlled that the cider stock contains at one time no more than about 2 to 4% of alcohol.

7. The method of producing cider vinegar of high acetic acid content which comprises subjecting a cider stock to a succession of passes through vinegar generating equipment, and adding grain alcohol to the stock in process of fermentation on entering each said pass, the amount of alcohol so added each time being from about 1% to about 2%, and the total quantity of alcohol added is from about 1 to about 10% of the cider stock, whereby a higher than normal strength cider vinegar is obtained having the flavor and aroma of a cider vinegar and having present therein malic acid and cider vinegar congeners in substantially the same percentages as in cider vinegar of normal grain strength.

8. The method of preparing a cider vinegar having a grain strength higher than normal and having substantially the flavor and aroma of a cider vinegar and having present therein malic acid and cider vinegar congeners in substantially the same percentages as in cider vinegar of normal grain strength which comprises introducing a cider stock containing natural alcohol to a vinegar generator and subjecting the stock to an acetous fermentation therein until part of the natural alcohol is converted to acetic acid, gradually adding grain alcohol to the generator in an amount not in excess of about 10% so that the stock undergoing acetous fermentation contains from about 2% to about 4% of alcohol and continuing the acetous fermentation of the fortified stock until a vinegar of the desired grain strength is produced.

VICTOR E. SPEAS.